(12) United States Patent
Hertz et al.

(10) Patent No.: US 12,182,068 B2
(45) Date of Patent: Dec. 31, 2024

(54) METHODS AND SYSTEMS FOR PROVIDING PERSISTENT STORAGE

(71) Applicant: Comcast Cable Communications, LLC, Philadelphia, PA (US)

(72) Inventors: Adam D. Hertz, San Francisco, CA (US); Michael A. Chen, Wallingford, PA (US); John Robinson, South Riding, VA (US); Ming-Chun Chiang, Fremont, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 329 days.

(21) Appl. No.: 14/688,626

(22) Filed: Apr. 16, 2015

(65) Prior Publication Data
US 2016/0306815 A1 Oct. 20, 2016

(51) Int. Cl.
| | | |
|---|---|---|
| *G06F 12/00* | (2006.01) | |
| *G06F 16/00* | (2019.01) | |
| *G06F 16/11* | (2019.01) | |
| *G06F 16/13* | (2019.01) | |
| *G06F 16/182* | (2019.01) | |
| *G06F 16/958* | (2019.01) | |
| *H04L 67/02* | (2022.01) | |
| *H04L 67/06* | (2022.01) | |
| *H04L 67/1097* | (2022.01) | |
| *H04L 67/303* | (2022.01) | |
| *H04L 67/306* | (2022.01) | |

(52) U.S. Cl.
CPC ............ *G06F 16/13* (2019.01); *G06F 16/116* (2019.01); *G06F 16/183* (2019.01); *G06F 16/986* (2019.01); *H04L 67/02* (2013.01); *H04L 67/06* (2013.01); *H04L 67/1097* (2013.01); *H04L 67/303* (2013.01); *H04L 67/306* (2013.01)

(58) Field of Classification Search
None
See application file for complete search history.

(56) References Cited

U.S. PATENT DOCUMENTS 7,840,691 B1 * 11/2010 De Bonet ............... G06Q 30/02
709/231
8,533,231 B2 9/2013 Aizman et al.
(Continued)

FOREIGN PATENT DOCUMENTS

CN 103618760 A 3/2014

*Primary Examiner* — Tuan A Pham
(74) *Attorney, Agent, or Firm* — Ballard Spahr LLP (57) ABSTRACT

Methods and systems are described for using files or data (e.g., cookies) stored in network storage (e.g., the cloud) in lieu of files or data stored locally. A request for a plurality of files can be received from a device. The request can comprise a device identifier and a user identifier. The user identifier can be used to determine an associated account. A format for the requested plurality of files can be determined based on the device identifier. In an aspect, the device can have limited/no local persistent storage. Prior to transmission, the requested plurality of files can be formatted according to the determined format. For example, a user can access an HTML application from a device with limited/no local persistent storage, such as a set-top box. The device can request a plurality of files, such as cookies, from persistent storage. The persistent storage can be cloud storage.

24 Claims, 6 Drawing Sheets

(56) References Cited

U.S. PATENT DOCUMENTS

| | | | |
|---|---|---|---|
| 8,554,836 B1* | 10/2013 | Wilson | G06Q 30/0214 709/203 |
| 8,650,249 B2 | 2/2014 | Canning et al. | |
| 8,656,154 B1 | 2/2014 | Kailash et al. | |
| 2005/0033850 A1* | 2/2005 | Kirkland | H04L 29/06027 709/228 |
| 2005/0177750 A1* | 8/2005 | Gasparini | G06F 21/31 726/5 |
| 2008/0134347 A1* | 6/2008 | Goyal | G06F 21/6209 726/29 |
| 2011/0041006 A1* | 2/2011 | Fowler | G06F 9/466 714/10 |
| 2011/0258488 A1* | 10/2011 | Nightingale | G06F 11/1658 714/15 |
| 2013/0007813 A1* | 1/2013 | Baskaran | H04N 21/27 725/56 |
| 2013/0246563 A1* | 9/2013 | Cardozo | G06F 16/955 709/217 |
| 2013/0290480 A1 | 10/2013 | Manion et al. | |
| 2013/0297662 A1* | 11/2013 | Sharma | H04L 63/0815 707/827 |
| 2014/0108263 A1* | 4/2014 | Ortiz | G06Q 20/3278 705/71 |
| 2014/0108956 A1* | 4/2014 | Varenhorst | G06F 3/04842 715/748 |
| 2015/0058393 A1* | 2/2015 | Smith | H04L 67/10 709/201 |
| 2015/0088890 A1* | 3/2015 | Hoffert | G06F 17/30598 707/737 |

* cited by examiner

METHODS AND SYSTEMS FOR PROVIDING PERSISTENT STORAGE

BACKGROUND

A variety of devices are capable of using applications, such as HyperText Markup Language (HTML) applications. Some applications use files or data, such as cookies, to provide certain functionality. There are devices capable of using such applications that were not created with cookie storage in mind, which results in diminished performance for HTML applications, and other applications that utilize cookies. These and other shortcomings of the prior art are addressed by the present disclosure.

SUMMARY

It is to be understood that both the following general description and the following detailed description are exemplary and explanatory only and are not restrictive. Methods and systems are described for using files or data (e.g., cookies) stored in network storage (e.g., the cloud) in lieu of files or data stored locally. In an aspect, a user can access an application (e.g., an HTML application) from a device with limited to no internal persistent storage, such as a common set-top box. However, the device can be configured to request one or more files or data, such as cookies, from persistent storage located elsewhere. For example, the device can request one or more files or data from persistent storage located remotely and/or on a network (e.g., cloud storage). In an aspect, the device can store the files and/or data in non-persistent storage and the application can access the files and/or data from the non-persistent storage as needed. If any of the files and/or data are changed in the non-persistent storage, the files and/or data stored in the persistent storage (e.g., cloud storage) can be updated to reflect the changes.

In an aspect, a request to run an application can be transmitted. A request for a plurality of files can be received in response to the request to run the application. The plurality of files can be associated with an account. Each of the plurality of files can be associated with a respective sub-account (e.g., profile, user profile, user device profile, etc.). Each respective sun-account can be associated with one of a plurality of users. The request for the plurality of files can be transmitted to a device configured to store the plurality of files in persistent storage. The requested plurality of files can be received. The requested plurality of files can be stored in non-persistent storage. A user of the plurality of users associated with the request to run the application can be determined. One or more of the received plurality of files from the respective sub-account associated with the determined user can be configured for use by the application.

In an aspect, a request for a plurality of files can be received from a first device. The request can comprise a first device identifier and a user identifier. The user identifier can be used to determine an associated account. The plurality of files can be retrieved from persistent storage based on the account. A format for the plurality of files can be determined based on the first device identifier. In an aspect, the first device can have limited or no local persistent storage. The plurality of files can be formatted based on the determined format. The formatted plurality of files can be transmitted to the first device.

In an aspect, a request to access an application can be received, and, in response, the application can be accessed. A request for a plurality of files can be received from the application. The request for the plurality of files can be transmitted to a device configured to store the plurality of files in persistent storage. The request can comprise a device identifier and a user identifier. The plurality of files can be received based on the device identifier and the user identifier. The received plurality of files can be stored in non-persistent storage. The received plurality of files can be configured for use by the application.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. If such a range is expressed, another embodiment includes from the one particular value and/or to the other particular value. Similarly, if values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that if combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing and/or utilizing persistent storage for devices with little or no persistent storage. In an aspect, an application, such as an HTML application, can typically use files and/or data stored locally on a device, such as cookies. In an aspect of the present disclosure, the device can utilize/access storage located in a network to store the files.

Methods and systems are described for using cloud cookies in lieu of cookies stored locally. In an aspect, a user can access an application (e.g., an HTML application) from a device with limited to no local persistent storage, such as a set-top box. In an aspect, the device can request a plurality of files, such as cookies, from persistent storage. For example, the persistent storage can be cloud storage. In an aspect, the device can store (e.g., temporarily) the plurality of files in non-persistent storage and the application can access the plurality of files from the non-persistent storage as needed. If any of the plurality of files are changed, the plurality of files stored on the cloud storage can be updated to reflect the changes. The timing of the request for the plurality of files can vary in various aspects. The plurality of files requested can vary in various aspects. For example, when a user begins using the device with limited to no local persistent storage, the device can determine the identity of the user and request the plurality of files. In an aspect, the plurality of files requested can be associated with the user. In another example, the user can run an application, and in response to running the application, the device can request the plurality of files. In an aspect, the plurality of files requested can be associated with the application. In another example, a running application can request a file, and in response to the request for and/or to run the application, the device can request the plurality of files. In an aspect, the plurality of files requested can be associated with both the determined user and the running application.

Methods and systems are described for using files and/or data stored remotely (e.g., cloud cookies) in lieu of files and/or data stored locally. Files and data are used herein interchangeably. The methods and systems are applicable to files, data, and any electronically stored information regardless of how the information is organized or is not organized. In an aspect, a user can access an HTML application (or other application that utilizes a cookie) from a device with limited to no local persistent storage, such as a set-top box. Persistent storage can be read-only memory (ROM), flash memory, ferroelectric random access memory (F-RAM), any other non-volatile memory, or any combination of the foregoing. Non-persistent storage can be any type of random access memory (RAM), including dynamic RAM (DRAM), double data rate synchronous DRAM (DDR SDRAM), static random-access memory (SRAM), any other volatile memory, or any combination of the foregoing. In an aspect, the device can request a plurality of files and/or data, such as cookies, from a remote persistent storage. For example, the remote persistent storage can be cloud storage. In an aspect, the device can store the plurality of files and/or data in local non-persistent storage and the HTML application can access the plurality of files and/or data from the local non-persistent storage as needed. If any of the plurality of files and/or data are changed, the plurality of files and/or data stored on the cloud storage can be updated to reflect the changes.

Figure 1:
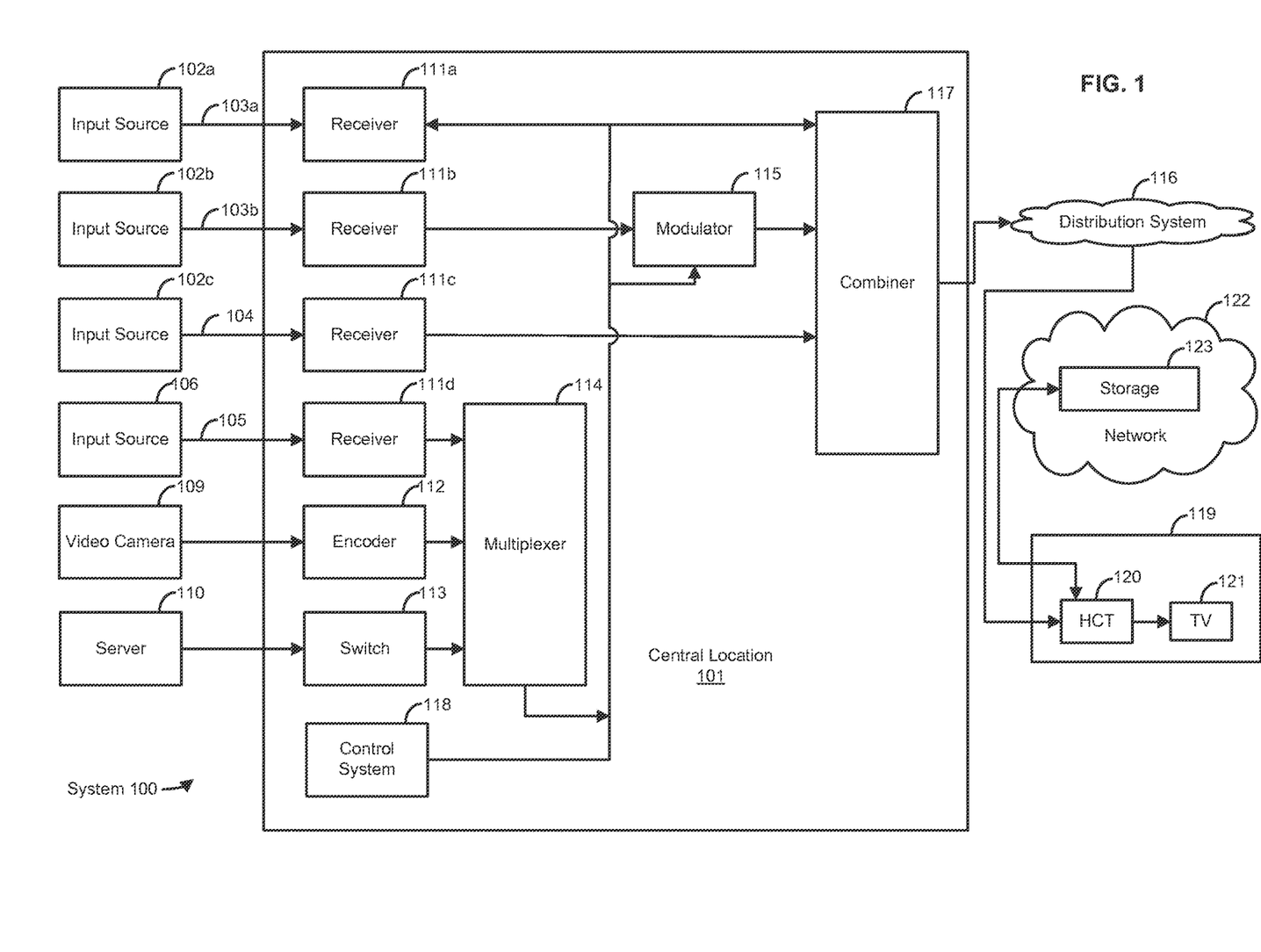
FIG. 1 is a block diagram of an exemplary system.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., video, audio, images, text, application files, data, input programming, and the like) from multiple sources. The central location 101 can combine the content from the various sources and can distribute the content to user (e.g., subscriber) locations (e.g., a location 119) via a distribution system 116.

In an aspect, the central location 101 can receive content from a variety of sources 102a, 102b, 102c. The content can be transmitted from the source to the central location 101 via a variety of transmission paths, such as wireless paths (e.g. satellite paths 103a, 103b) and a terrestrial path 104. The central location 101 can also receive content from an input source 106 via a direct line 105. Other input sources can comprise capture devices, such as a video camera 109, a server 110, and/or the like. The content provided by the content sources can comprise a single content item, a portion of a content item (e.g., content fragment), a content stream, a multiplex that includes several content items, and/or the like.

The central location 101 can comprise one or a plurality of receivers 111a, 111b, 111c, 111d that are associated with one or more corresponding input sources. The central location 101 can comprise one or more encoders 112, switches 113, multiplexers 114, and/or the like. For example, an encoder 112 can compress, encrypt, transform, and/or otherwise encode content. As a further example, the encoder 112 can encode content based on one or more compression standards, such as MPEG. As another example, the encoder can receive content from the video camera 109 and/or other source and apply one or more encoding algorithms to the received content. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by the multiplexer 114.

The central location 101 can comprise one or more modulators 115 for interfacing with a distribution system 116. As an example, a modulator can receive content from the receiver 111, the encoder 112, the multiplexer 114, and/or the like. A modulator 115 can convert the received content into a modulated output signal suitable for transmission over the distribution system 116. For example, the modulator 115 can map portions of the content to data bits expressed as signals (e.g., sinusoidal signals) at corresponding subcarrier frequencies of a data symbol. The output signals from the modulators 115 can be combined, using equipment such as a combiner 117, for input into the distribution system 116.

A control system 118 can permit a system operator to control and monitor the functions and performance of the system 100. The control system 118 can interface, monitor, and/or control a variety of functions, including, but not limited to, the channel lineup for a television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The distribution system 116 can distribute content from the central location 101 to user locations, such as a user location 119. The distribution system 116 can be an optical fiber network, a coaxial cable network, a hybrid fiber-coaxial network, a wireless network, a satellite system, a direct broadcast system, or any combination thereof. A home communications terminal (HCT) 120 can be any device for terminating a communication at a customer's premises, such as a set-top box, a gateway, a router, or the like, or any combination of the foregoing. There can be a multitude of user locations connected to distribution system 116. At the user location 119, a decoder, such as the HCT 120, can decode, if needed, the signals for display on a display device, such as on a television set (TV) 121 or a computer monitor. Those skilled in the art will appreciate that the signal can be decoded in a variety of equipment, including an HCT 120, a computer, the TV 121, a monitor, or satellite dish. In an exemplary aspect, the methods and systems disclosed can be located within, or performed on, one or more HCT's 120, TV's 121, central locations 101, DVR's, home theater PC's, and the like.

In an aspect, the user location 119 is necessarily not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within one or more HCT's 120 and/or one or more network 122. For example, the one or more HCT's 120 can have limited or no local persistent storage. A network 122 in communication with the one or more HCT's 120 can have persistent storage 123. The persistent storage 123 can be located on one or more computing devices. The one or more HCT's 120 can run applications. Applications can include HTML applications, program guides, on-demand navigation, and the like. In an aspect, an application can comprise a service. In a further aspect, an application can comprise a web-based service. Applications running on the one or more HCT's 120 can use files and/or data. In an aspect, files can include cookies. In an aspect, an application can preserve a user's state with the file. For example, if the application is a game, the file can preserve the user's progress in the game. However, because the one or more HCT's 120 running the application have little or no local persistent memory, the one or more HCT's 120 may not be able to store the file locally for later use of the application. To preserve the user's state, the file can be transmitted to remote persistent storage for later retrieval (e.g., from the persistent storage 123).

Figure 2:
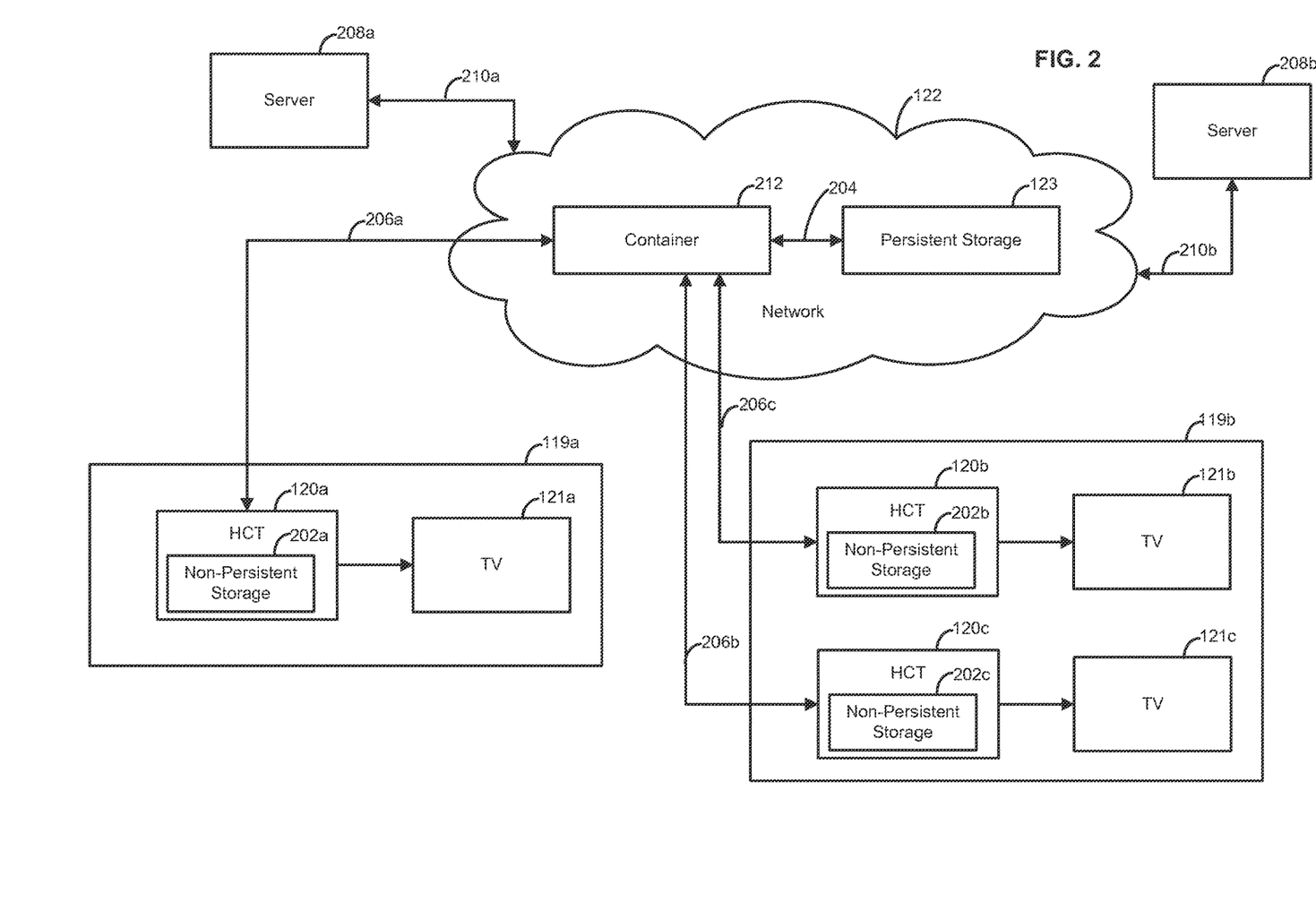
FIG. 2 is a block diagram of an exemplary system.

Turning now to FIG. 2, a block diagram of an exemplary system is illustrated. In an aspect, a user at a premises 119a, 119b can access an application hosted on one or more servers 208a, 208b through the one or more HCT's 120a, 120b, 120c. For example, an application can be an HTML application. In an aspect, the application can be a game. In an aspect, the application can allow a user to order a product and/or service. The one or more HCT's 120a, 120b, 120c can comprise limited or no local persistent storage. The one or more HCT's 120a, 120b, 120c can comprise local non-persistent storage 202a, 202b, 202c. The one or more HCT's 120a, 120b, 120c can communicate with the one or more servers 208a, 208b via a network 122. The one or more HCT's 120a, 120b, 120c can control/influence what is displayed on a display, such as a television 121a, 121b, 121c. The one or more HCT's 120a, 120b, 120c can communicate with the network 122 through one or more communication paths 206a, 206b, 206c. The one or more servers 208a, 208b can communicate with the network 122 through one or more communication paths 210a, 210b. In an aspect, the application accessed by the one or more HCT's

120a, 120b, 120c can request a stored file, such as a cookie. In an aspect, the stored file can relate to a user and/or device profile. In an aspect, the stored file can relate to a state of a profile. In an aspect, the one or more HCT's 120a, 120b, 120c can transmit a request for the stored file to the remote persistent storage 123 in the network 122. The stored file can be transmitted from the remote persistent storage 123 to the local non-persistent storage 202a, 202b, 202c in the one or more HCT's 120a, 120b, 120c. If the file is altered after it has been provided to/stored in the local non-persistent storage 202a, 202b, 202c of the one or more HCT's 120a, 120b, 120c, then the altered file can be transmitted from the local non-persistent storage 202a, 202b, 202c back to the remote persistent storage 123 to preserve the alteration to the file.

In an aspect, launching an application can cause the one or more HCT's 120a, 120b, 120c to create a web engine instance in the local non-persistent storage 202a, 202b, 202c. In an aspect, a web engine instance can be an instance of a data object for managing interaction with the application. In an aspect, a web engine instance can be an instance of an object implementing an HTMLView interface. In an aspect, the one or more HCT's 120a, 120b, 120c can create a web engine instance in the local non-persistent storage 202a, 202b, 202c in preparation of launching an application. In an aspect, the one or more HCT's 120a, 120b, 120c can create a web engine instance in the local non-persistent storage 202a, 202b, 202c in response to activation. In an aspect, the web engine instance can be executed and rendered locally on the HCTs (e.g., HCT's 120a, 120b, 120c). In another aspect, the web engine instance can be executed non-locally (e.g. a cloud instance) and rendered (e.g., decoded compressed video streamed from a cloud instance) on the HCTs. In an aspect, a container 212, such as a cross-platform runtime environment (XRE) container in the network 122 can transmit a signal to the one or more HCT's 120a, 120b, 120c indicating that a web engine instance should be created in the local non-persistent storage 202a, 202b, 202c. In an aspect, the container 212 can act as an intermediary between the non-persistent storage 202a, 202b, 202c of the one or more HCT's and the network persistent storage 123. In an aspect, the web engine instance can be an instance of HTML View. In an aspect, the container 212 in the network 122 can provide a plurality of files, such as a cookie jar, to the one or more HCT's 120a, 120b, 120c. In an aspect, the container 212 can create the provided plurality of files. In an aspect, the container 212 can retrieve the provided plurality of files from the persistent storage 123 in the network 122. In an aspect, the container 212 and the persistent storage 123 can communicate via a communication path 204. In an aspect, if one or more of the provided plurality of files in the non-persistent storage 202a, 202b, 202c has been altered, the corresponding one or more HCT's 120a, 120b, 120c can transmit the altered plurality of files to the container 212 via a communication path 206a, 206b, 206c. In an aspect, changes in the persistent storage 123 can trigger updates to the container 212 and therefore updates to the non-persistent storage 202a, 202b, and 202c.

In an aspect, a plurality of files can be unique for a particular user. For example, a user can access an application from the HCT 120a, which in turn can cause a plurality of files to be accessed from the persistent storage 123 and stored in the non-persistent storage 202a. If the user accesses the HTML application from the HCT 120b, the same plurality of files can be accessed from the persistent storage 123 and stored in the non-persistent storage 202b. In an aspect, a plurality of files can be unique for a particular premises 119a, 119b. For example, a user at the premises 119b can access an HTML application from the HCT 120b, which in turn can cause a plurality of files to be accessed from the persistent storage 123 and stored in the non-persistent storage 202b. If the user or a second user accesses the HTML application from the HCT 120c in the same premises 119b, the same plurality of files can be accessed from the persistent storage 123 and stored in the non-persistent storage 202c. In an aspect, a plurality of files can be unique to a particular HCT 120a, 120b, 120c. For example, a user can access an HTML application from the HCT 120b, which in turn can cause a plurality of files to be accessed from the persistent storage 123 and stored in the non-persistent storage 202b. If the user or a second user accesses the application from the HCT 120b, the same plurality of files can be accessed from the persistent storage 123 and stored in the non-persistent storage 202b. The plurality of files (e.g., cookie jars) can be assigned in a variety of ways. For example, cookies (files) can be assigned on a per-device basis, a per-device-per-user basis, a per-user basis. Cookies can be assigned based on one or more of: websites, devices, users, external states, such as fitness band proximity and the like. Cookie assignment can be applied in non-consumer premises equipment (CPE) contexts, such as emulated devices in the cloud. Any combination of the foregoing can be used. In an aspect, a plurality of files (e.g., cookies and/or cookie jars) can be assigned to a particular device (e.g., a set-top box). The particular device can serve a plurality of users. An account can be associated with the particular subscription, premises, device, and/or CPE (e.g., a set-top box), and each of the plurality of users can be associated with a respective sub-account (e.g., profile, user profile, user device profile, etc.) of the account. For example, am account can include a plurality of users associated with a subscription, and can be, for instance, tied to a location. As an example, a family can have an account, and each member of the family can have a sub-account. For applications that require user personalization, if a plurality of users are utilizing the same particular device, a selection menu can be presented for a user to select the respective sub-account associated with the user. Other techniques for sub-account selection can be used, for example, face recognition, personal device recognition, and the like. Sub-account selection can determine which file (e.g., cookie and/or cookie jar) is to be loaded into the web engine instance. For applications that do not require user personalization or if there is only one user utilizing the particular device, a sub-account associated with a default user (e.g., the most frequent user) can be automatically selected. Thus, the file (e.g., cookie and/or cookie jar) associated with the default user can be loaded into the web engine instance.

Figure 3:
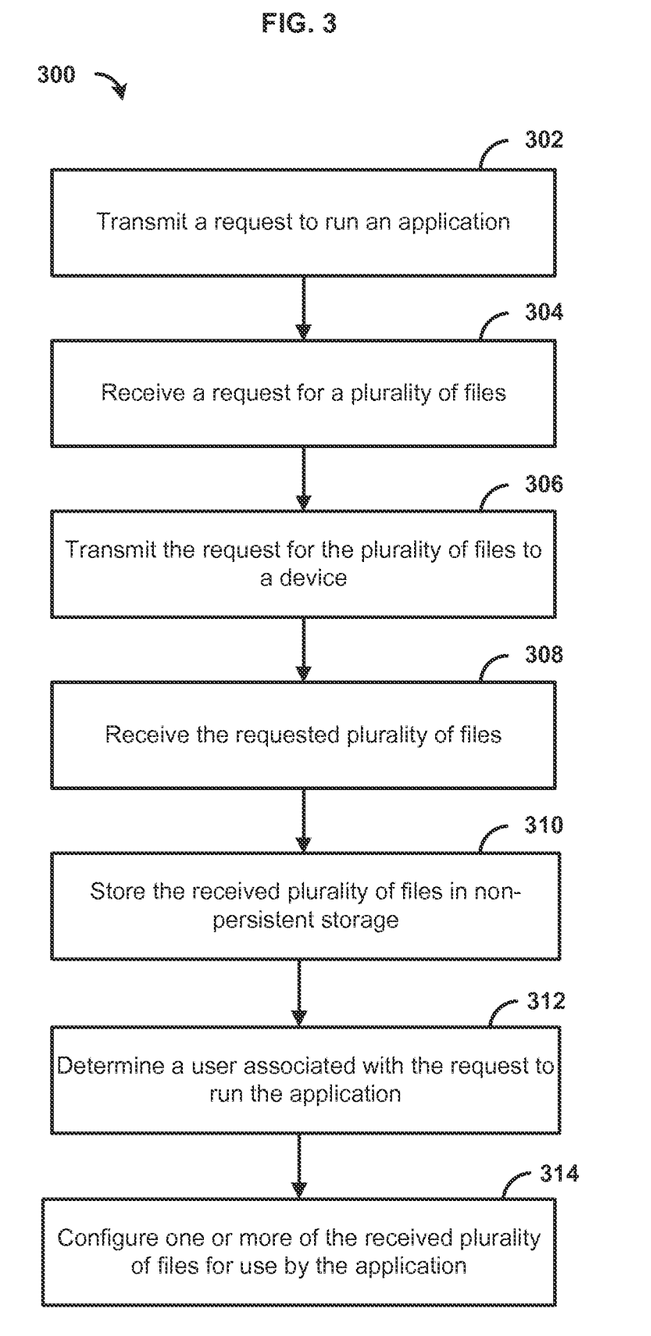
FIG. 3 is a flow chart of an exemplary method.

FIG. 3 is a flowchart illustrating an example method 300. At step 302, a request to run an application can be transmitted. In an aspect, the request to run the application can be transmitted from an HCT 120a, 120b, 120c for routing through a network 122 to a server 208a, 208b. The request can be made using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the request to run an application can be a request for a network location. For example, the request to run an application can be a request for a website. In an aspect, the request to run an application can be a request to run an HTML application. In an aspect, an application can be launched in response to the request to run the application. See the description for FIG.

2 above for more details on a transmitted request for an application (e.g., a network location).

At step 304, a request for a plurality of files can be received. The request for the plurality of files can be received in response to the request to run the application. In an aspect, the plurality of files can be associated with an account. For example, the account can be associated with a particular subscription, premises, device, and/or CPE (e.g., a set-top box). In an aspect, each of the plurality of files can be associated with a respective sub-account. In an aspect, each respective sub-account can be associated with one of a plurality of users. In an aspect, a launched application can request a plurality of files. In an aspect, the launched application can run locally on an HCT 120a, 120b, 120c or remotely on one or more servers 208a, 208b. In an aspect, a web engine instance can be executed and rendered locally on the HCTs (e.g., HCT's 120a, 120b, 120c). In another aspect, the web engine instance can be executed non-locally (e.g. a cloud instance) and rendered (e.g., decoded compressed video streamed from the cloud instance) on HCTs. The request can be made using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the plurality of files can be a cookie jar. For example, the cookie jar can comprise a plurality of web cookies. In an aspect, the plurality of files can preserve the state of a profile, user, and/or device. See the description for FIG. 2 above for more details on a received request for a plurality of files.

At step 306, the request for the plurality of files can be transmitted to a device configured to store the plurality of files in persistent storage. In an aspect, the HCT 120a, 120b, 120c can transmit the request for the plurality of files to the persistent storage 123 in the network 122. In an aspect, the request for the plurality of files can be transmitted to a device with persistent storage in response to the received request for the plurality of files. The request can be transmitted using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the device that stores the plurality of files in persistent storage can be located within a network. In an aspect, the device with persistent storage can be cloud storage. See the description for FIG. 2 above for more details on the transmitted request for the plurality of files to a device with persistent storage.

At step 308, the requested plurality of files can be received. The requested plurality of files can be transmitted from the remote persistent storage 123 to the local non-persistent storage 202a, 202b, 202c in the one or more HCT's 120a, 120b, 120c. If a file is altered after it has been provided to the local non-persistent storage 202a, 202b, 202c of the one or more HCT's 120a, 120b, 120c, then the altered file can be transmitted from the local non-persistent storage 202a, 202b, 202c back to the remote persistent storage 123 to preserve the alteration to the file.

At step 310, the received plurality of files can be stored in non-persistent storage. In an aspect, an HCT 120a, 120b, 120c can store the received plurality of files in the local non-persistent storage 202a, 202b, 202c. In an aspect, the non-persistent storage can be RAM memory. See the description for FIG. 2 above for more details on storing the received plurality of files in non-persistent storage.

In an aspect, the stored plurality of files can be used by an application for a variety of reasons. For example, an application running on an HCT 120a, 120b, 120c or an application accessed through an HCT 120a, 120b, 120c and running on one or more servers 208a, 208b can use one or more of the plurality of files stored in the non-persistent storage 202a, 202b, 202c of the HCT 120a, 120b, 120c to provide a user's login information. In another example, the application can comprise a game, and the game can use one or more of the plurality of files stored in the non-persistent storage 202a, 202b, 202c of the HCT 120a, 120b, 120c to preserve a user's state in the game. In another example, the application can comprise a merchant's site, and the merchant's site can use one or more of the plurality of files stored in the non-persistent storage 202a, 202b, 202c of the HCT 120a, 120b, 120c to preserve a user's order information, product wish list, or other information relating to the merchant's site.

In an aspect, the requested plurality of files can be updated in the non-persistent storage 202a, 202b, 202c. Optionally, in an aspect, one or more of the updated plurality of files can be transmitted to the persistent storage 123. In an aspect, the requested plurality of files can be replaced in the persistent storage 123 by the updated plurality of files. In an aspect, one of the requested plurality of files can be updated. In an aspect, one of the updated plurality of files can be transmitted. In an aspect, the updated file can be transmitted to the persistent storage 123. In an aspect, the updated file can replace the corresponding requested file in persistent storage 123. See the description for FIG. 2 above for more details on updating the requested plurality of files in the persistent storage 123.

At step 312, a user of the plurality of users associated with the request to run the application can be determined. In an aspect, the user of the plurality of users associated with the request can be determined based on user information (e.g., login information, device identifier, user identifier, user profile, etc.). The user information can be received from the request for the application. Other techniques for user identification can be used, for example, face recognition, personal device recognition, and the like.

At step 314, one or more of the received plurality of files from the respective sub-account associated with the determined user can be configured for use by the application. For example, an HCT (e.g., HCT 120a, 120b, 120c) can receive the requested plurality of files from the persistent storage 123 in the network 122. For example, it can be determined that a particular user is requesting an application via HCT 120. Accordingly, one or more of the received plurality of files associated with the particular user can be provided from the memory location in persistent storage 123 associated with the particular user's account for use by the application. As an example, the one or more of the received plurality of files can relate to the particular user's profile, the particular user's device profile, state of the particular user profile and/or state of the particular user's device profile. The one or more of the plurality of files can be received using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the plurality of files can be a cookie jar. For example, the cookie jar can comprise a plurality of web cookies. See the description for FIG. 2 above for more details on receiving the requested plurality of files.

Figure 4:
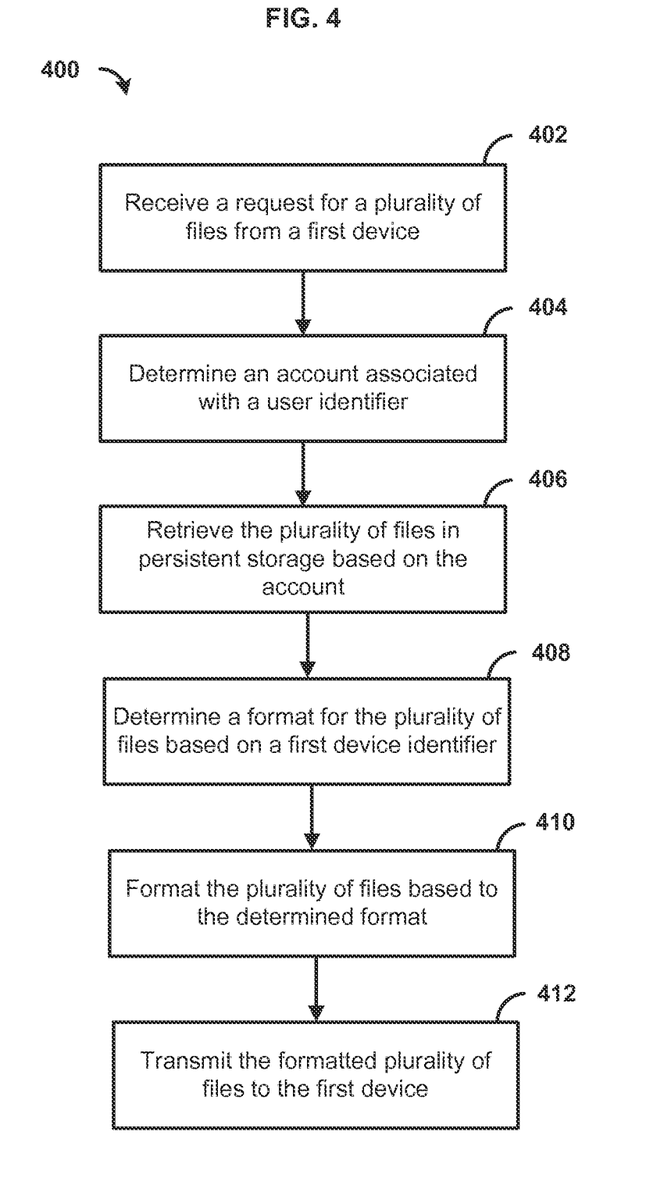
FIG. 4 is a flow chart of an exemplary method.

FIG. 4 is a flowchart illustrating an example method 400. At step 402, a request for a plurality of files can be received from a first device. As an example, the request for a plurality of files can comprise a request for a plurality of cookies for a particular user to access an application (e.g., a merchant's website). In an aspect, the first device can have limited or no local persistent storage. The request can be received using any network protocol, including Hypertext Transfer Protocol (HTTP), Hypertext Transfer Protocol Secure (HTTPS), File Transfer Protocol (FTP). Internet Protocol (IP), Transmission Control Protocol (TCP), or any other type of network protocol. In an aspect, the first device can be a set-top box. In an aspect, persistent storage 123 in a network 122 can receive the request for the plurality of files from one or more HCT's 120a, 120b, 120c. In an aspect, a device in communication with the persistent storage 123 in the network 122 can receive the request for the plurality of files from one or more HCT's 120a, 120b, 120c. In an aspect, the first device can receive a request to access at least one of the plurality of files from a second device. In an aspect, the second device can be a computing device, such as a server. In an aspect, the second device can host an application, such as an HTML application. In an aspect, a plurality of files can be a cookie jar. For example, the cookie jar can comprise a plurality of web cookies. In an aspect, the request can comprise a first device identifier and a user identifier. See the description for FIG. 2 above for more details on receiving a request for a plurality of files from a device with limited or no local persistent storage.

At step 404, an account associated with the user identifier can be determined. For example, a particular CPE (e.g., a set-top box) can serve a plurality of users, and each of the plurality of users can have a respective account associated with the CPE. In an aspect, for applications that require user personalization, if a plurality of users are utilizing the same particular device, a selection menu can be presented for a user to select the respective account associated with the user. Other techniques for account selection can be used, for example, face recognition, personal device recognition, user information, and the like.

A step 406, the plurality of files in persistent storage can be retrieved based on the account. In an aspect, the plurality of files for the account can be located (e.g., determined, identified) in persistent storage (e.g., persistent storage 123). In an aspect, a plurality of files can be a cookie jar. For example, the cookie jar can comprise a plurality of web cookies. Specifically, a cookie for a particular user to complete launching a website can be located. The cookie can comprise a previous state of the website usage for the particular user.

At step 408, a format for the plurality of files can be determined based on the first device identifier. In an aspect, the format of the requested plurality of files (e.g., cookies) can vary based on which device is requesting access to the application. For example, cookies for a personal computer to launch a website can have one format, and cookies for a set-top box to launch the same website can have a second format. A device identifier (e.g., first device identifier) can indicate the type of device (e.g., personal computer, smartphone, set-top box, etc.) and therefore can be used to determine a format for the plurality of files.

At step 410, the plurality of files can be formatted based on the determined format. For example, if it is determined that a particular user is requesting access to an application via a smartphone, the plurality of files (e.g., cookies) can be modified according to a format suitable for the smartphone. In another aspect, the requested plurality of files can be transmitted from the persistent storage (e.g., persistent storage 123) to non-persistent storage (non-persistent storage 202a, 202b, 202c) and formatted at the device with the non-persistent storage.

At step 412, the formatted plurality of files can be transmitted to the first device. The files can be transmitted using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the requested plurality of files can be transmitted from the persistent storage 123 in the network 122 to one or more HCT's 120a, 120b, 120c. In an aspect, the first device can be a set-top box. In an aspect, a plurality of files can be a cookie jar. For example, the cookie jar can comprise a plurality of web cookies. See the description for FIG. 2 above for more details on transmitting the requested plurality of files to the first device.

Optionally, in an aspect, an updated version of the plurality of files can be received. The files can be received using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the persistent storage 123 in the network 122 can receive the updated version of the plurality of files from one or more HCT's 120a, 120b, 120c. Optionally, in an aspect, the plurality of files can be replaced in the persistent storage 123 with the updated version. In an aspect, an updated version of one of the requested plurality of files can be received. The file can be received using any network protocol, including Hypertext Transfer Protocol (HTTP), Hypertext Transfer Protocol Secure (HTTPS), File Transfer Protocol (FTP). Internet Protocol (IP), Transmission Control Protocol (TCP), or any other type of network protocol. In an aspect, the persistent storage 123 in a network 122 can receive the updated version of the file from one or more HCT's 120a, 120b, 120c. In an aspect, the updated version of the file can replace the corresponding file in the persistent storage 123. See the description for FIG. 2 above for more details on updating the requested plurality of files in the persistent storage 123.

Optionally, in an aspect, a request for the plurality of files can be received from a second device. The request can be made using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the second device can be configured with limited or no local persistent storage. In an aspect, the second device can be an HCT 120a, 120b, 120c. In an aspect, the plurality of files can be retrieved in the persistent storage 123. In an aspect, the plurality of files can be transmitted to the second device. The files can be transmitted using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, if two or more devices access the plurality of files from the persistent storage 123, the plurality of files stored in the persistent storage 123 can be updated by any of the two or more devices.

In an aspect, if two or more devices access the plurality of files, only the device with control of the plurality of files can update the plurality of files in the persistent storage 123. In an aspect, a device in and/or with control of the plurality of files can be said to have write permission of the plurality of files. In an aspect, determining the device with control (e.g., write permission) of the plurality of files can be done in a number of ways. In an aspect, a time associated with retrieval of the plurality of files at the first device relative to a time associated with retrieval of the plurality of files at the second device can be used to determine control (e.g., write permission). For example, the device determined to access the plurality of files most recently can be determined to be the device with control (e.g., write permission) of the plurality of files. In another example, the device determined to access the plurality of files first can be determined to be the device with control (e.g., write permission) of the plurality of files. In an aspect, determining the device with control (e.g., write permission) of the plurality of files can be based on a priority. In a further aspect, the priority can be based on one or more types of devices. For example, a set-top box can have priority over a smart phone. In a further aspect, the priority can be based on one or more users. For example, a parent can have priority over a child. Any other priorities can be used and any combination of the foregoing can be used. In an aspect, only one device can be allowed access at a time. In an aspect, a variable can be used to indicate if a device has "checked out" the plurality of files or if the plurality of files is available. In an aspect, a semaphore can be used to indicate whether the plurality of files is checked out or available. For example, if two devices attempt to access a plurality of files (e.g., cookie jars) for a same domain, the first device that attempts to access the domain can retain access until the access is completed (e.g., semaphore acquire and release). Alternatively, there are other usage scenarios where "last-one-sticks" is more appropriate (e.g. using resume point for a given piece of content, stored in cookie form). For example, a second device can prompt a first device to either relinquish control entirely, or accept a write from the second device. In an aspect, a message in one or more of the requested received from the first device and the request received from the second device can be used to determine control (e.g., write permission). For example, a request can comprise an indication that the requesting device will have control (e.g., write permission.) In an example, a request can comprise an indication that the requesting device will not have control (e.g., write permission). In an example, site metadata can be used to determine whether exclusive access or concurrent access is appropriate.

In an aspect, a determination can be made that the second device controls (e.g., has write permission over) the plurality of files. In an aspect, an updated version of the requested plurality of files can be received from the second device. The files can be received using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. The requested plurality of files in the persistent storage 123 can be replaced with the updated version from the second device. In an aspect, the replaced plurality of files from the second device can be transmitted to the first device. In an aspect, an updated version of the requested plurality of files can be received from the first device. The files can be received using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. A refusal to replace the requested plurality of files in the persistent storage 123 with the updated version from the first device can be made.

In another aspect, a determination can be made that the second device does not control (e.g., does not have write permission over) the plurality of files. In an aspect, an updated version of the requested plurality of files can be received from the second device. The files can be received using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. The requested plurality of files in the persistent storage 123 can be remain as the updated version from the second device are refused in response to the determination that the second device does not have control (e.g., does not have write permission over) the plurality of files.

In an aspect, the plurality of files can be used by an application for a variety of reasons. For example, an application running on an HCT 120a, 120b, 120c or an application accessed through an HCT 120a, 120b, 120c and running on one or more servers 208a, 208b can use one or more of the plurality of files stored in the non-persistent storage 202a, 202b, 202c of the HCT 120a, 120b, 120c to provide a user's login information. In another example, the application can comprise a game, and the game can use one or more of the plurality of files stored in the non-persistent storage 202a, 202b, 202c of the HCT 120a, 120b, 120c to preserve a user's state in the game. In another example, the application can comprise a merchant's site, and the merchant's site can use one or more of the plurality of files stored in the non-persistent storage 202a, 202b, 202c of the HCT 120a, 120b, 120c to preserve a user's order information, product wish list, or other information relating to the merchant's site.

Figure 5:
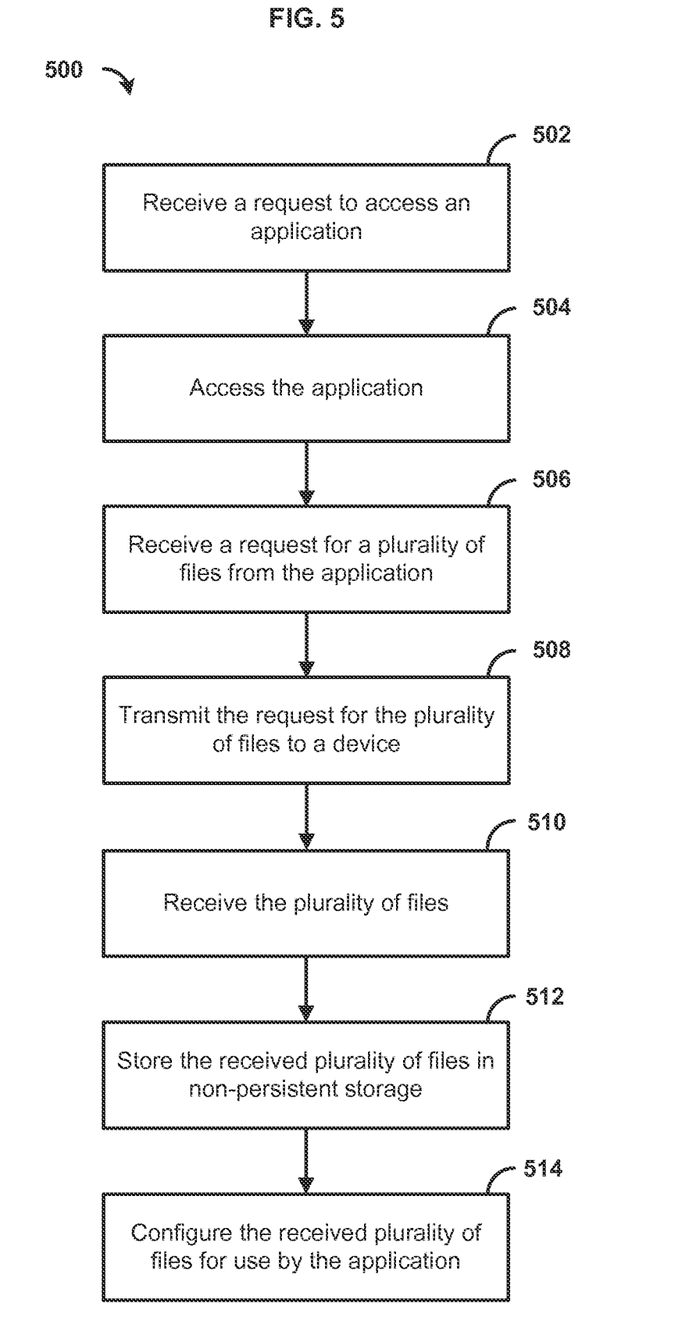
FIG. 5 is a flow chart of an exemplary method.

FIG. 5 is a flowchart illustrating an example method 500. At step 502, a request to access an application can be received. In an aspect, the request for the application can be transmitted from an HCT 120a, 120b, 120c for routing through a network 122 to a server 208a, 208b. The request can be made using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the request for an application can be a request for a network location. In an aspect, the request for an application can be a request for a website. For example, the request for an application can be a request for an HTML application.

At step 504, the application can be accessed. In an aspect, the application can be accessed (e.g., launched) in response to the request for the application. For example, a particular website can be launched in response to the request for the application. In an aspect, the application can be launched at a device with limited or no local persistent storage. In an aspect, the launched application can run locally on an HCT 120a, 120b, 120c or remotely on one or more servers 208a, 208b. In an aspect, a web engine instance can be executed if an application is accessed. For example, a web engine instance can be executed and rendered locally on the HCTs (e.g., HCT's 120a, 120b, 120c). In another aspect, the web engine instance can be executed non-locally (e.g. a cloud instance) and rendered (e.g., decoded compressed video streamed from the cloud instance) on HCTs. In an aspect, accessing the application can comprise accessing an HTML application.

At step 506, a request for a plurality of files can be received from the application. The request can be made using any network protocol, including Hypertext Transfer Protocol (HTTP), Hypertext Transfer Protocol Secure (HTTPS), File Transfer Protocol (FTP). Internet Protocol (IP), Transmission Control Protocol (TCP), or any other type of network protocol. In an aspect, the request for a plurality of files can be received from the application launched on a first device. In an aspect, the first device can have limited or no local persistent storage. In an aspect, the first device can be a set-top box. In an aspect, container 212 in a network 122 can receive the request for the plurality of files from one or more HCT's 120a, 120b, 120c. In an aspect, the container 212 can act as an interface between the persistent storage 123 in the network 122 and the one or more HCT's 120a, 120b, 120c. In an aspect, the first device can receive a request to access at least one of the plurality of files from a second device. The request can be made using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the second device can be a website server. In an aspect, the second device can host an application, such as an HTML application. In an aspect, a plurality of files can be a cookie jar. For example, the cookie jar can comprise a plurality of web cookies. See the description for FIG. 2 above for more details on receiving a request for a plurality of files from a device with limited or no local the persistent storage 123.

At step 508, the request for the plurality of files can be transmitted to a device configured to store the plurality of files in persistent storage. In an aspect, the request can comprise a device identifier and a user identifier. The request can be transmitted using any network protocol, including Hypertext Transfer Protocol (HTTP), Hypertext Transfer Protocol Secure (HTTPS), File Transfer Protocol (FTP). Internet Protocol (IP), Transmission Control Protocol (TCP), or any other type of network protocol. In an aspect, the container 212 can transmit the request for the plurality of files to the persistent storage 123 via a communication path 204. In an aspect, the container 212 can transmit the request to a device in communication with the persistent storage 123. In an aspect, the second device can store the plurality of files in the persistent storage 123. In an aspect, the device with the persistent storage 123 can be located within a network. In an aspect, the device with the persistent storage 123 can be cloud storage. See the description for FIG. 2 above for more details on the transmitted request for the plurality of files to a device with the persistent storage 123.

At step 510, the plurality of files can be received based on the device identifier and the user identifier. In an aspect, the plurality of files can vary based on a particular user and a particular device. For example, the format of the plurality of files (e.g., cookies) associated with a particular user can vary based on the type of device that requests access to an application. For example, cookies for a personal computer to launch a website can have a different format than a set-top box to launch the same website. A device identifier (e.g., first device identifier) can indicate the type of device (e.g., personal computer, smartphone, set-top box, etc.) and therefore can be used to determine a format for the plurality of files. In another aspect, a particular device (e.g., a set-top box) can serve a plurality of users, and each of the plurality of users can have a respective account associated with the particular device. In an aspect, for applications that require user personalization, if a plurality of users are utilizing the same particular device, the plurality of files can vary based on the particular user that request to access the application.

In an aspect, the requested plurality of files can be received from the second device. The files can be received using any network protocol, including Hypertext Transfer Protocol (HTTP), Hypertext Transfer Protocol Secure (HTTPS), File Transfer Protocol (FTP), Internet Protocol (IP). Transmission Control Protocol (TCP), or any other type of network protocol. In an aspect, the container 212 can receive the files from the persistent storage 123 via the communication path 204. In an aspect, the container 212 can receive the files from a device in communication with the persistent storage 123. In an aspect, the plurality of files can be a cookie jar. For example, the cookie jar can comprise a plurality of web cookies. See the description for FIG. 2 above for more details on receiving the requested plurality of files.

At step 512, the received plurality of files can be stored in non-persistent storage. For example, an HCT 120a, 120b, 120c can store the received plurality of files in local non-persistent storage 202a, 202b, 202c. In an aspect, the non-persistent storage can be RAM memory. See the description for FIG. 2 above for more details on storing the received plurality of files in non-persistent storage.

At step 514, the received plurality of files can be configured for use by the application. The received plurality of files can be provided (e.g., delivered, transmitted, etc.) to the application using any network protocol, including Hypertext Transfer Protocol (HTTP), Hypertext Transfer Protocol Secure (HTTPS), File Transfer Protocol (FTP), Internet Protocol (IP), Transmission Control Protocol (TCP), or any other type of network protocol. In an aspect, the container 212 can transmit the files to one or more HCT's 120a, 120b, 120c. In an aspect, the transmitted plurality of files can be stored in non-persistent storage 202a, 202b, 202c in the first device. In an aspect, the non-persistent storage 202a, 202b, 202c can be RAM. See the description for FIG. 2 above for more details on transmitting the received plurality of files.

In an aspect the plurality of files can be used by an application for a variety of reasons. For example, an application running on an HCT 120a, 120b, 120c or an application accessed through an HCT 120a, 120b, 120c and running on one or more servers 208a, 208b can use one or more of the plurality of files stored in the non-persistent storage 202a, 202b, 202c of the HCT 120a, 120b, 120c to provide a user's login information. In one example, the application can comprise a game, and the game can use one or more of the plurality of files stored in the non-persistent storage 202a, 202b, 202c of the HCT 120a, 120b, 120c to preserve a user's state in the game. In another example, the application can comprise a merchant's site, and the merchant's site can use one or more of the plurality of files stored in the non-persistent storage 202a, 202b, 202c of the HCT 120a, 120b, 120c to preserve a user's order information, product wish list, or other information relating to the merchant's site.

Figure 6:
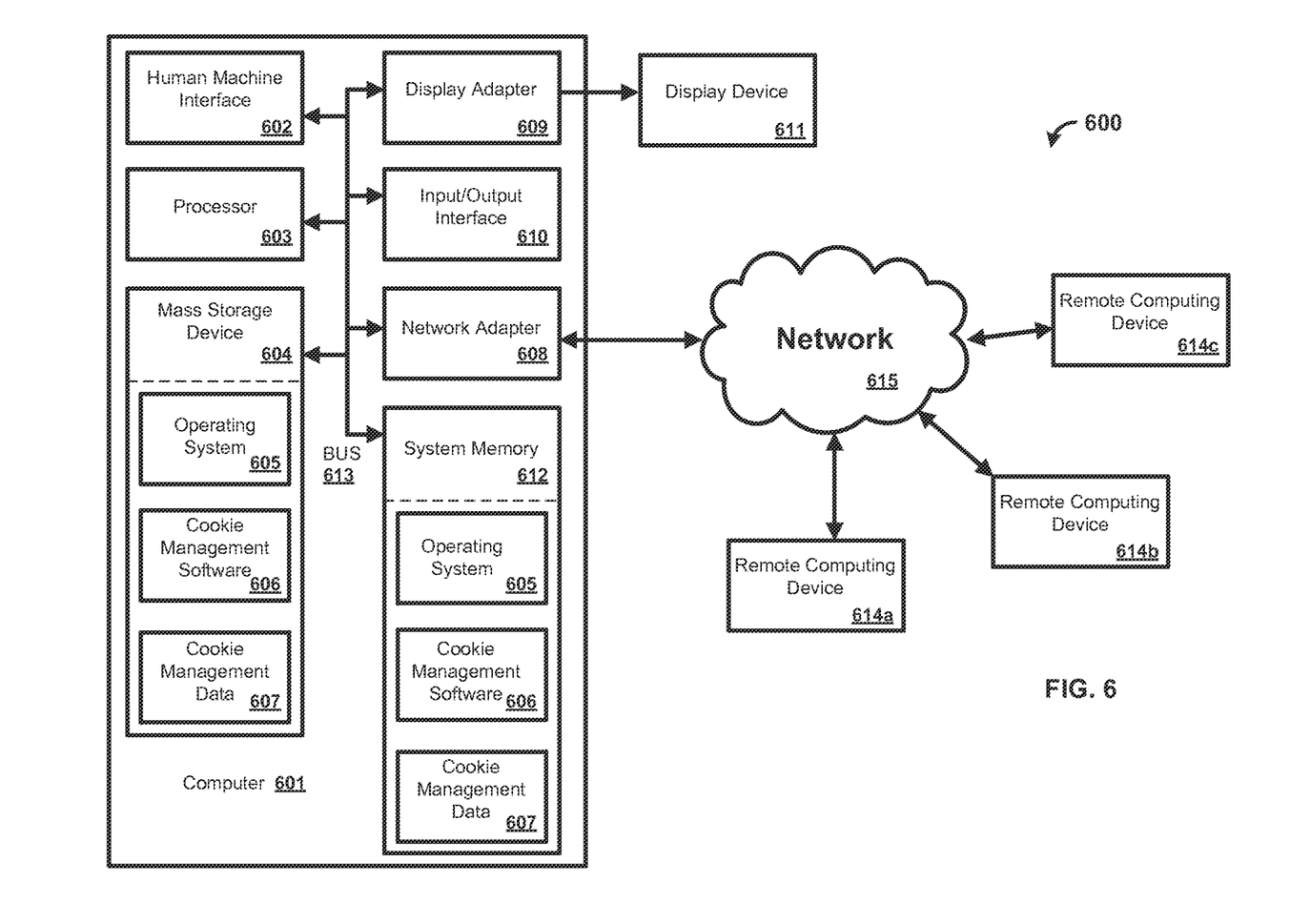
FIG. 6 is a block diagram of an exemplary computing device.

In an exemplary aspect, the methods and systems can be implemented on a computer 601 as illustrated in FIG. 6 and described below. By way of example, the server 110 of FIG. 1 or the servers 208a,b of FIG. 2 can be one or more computers 601 as illustrated in FIG. 6. Similarly, the methods and systems disclosed can utilize one or more computers to perform one or more functions in one or more locations. FIG. 6 is a block diagram illustrating an exemplary operating environment 600 for performing the disclosed methods. This exemplary operating environment 600 is only an example of an operating environment and is not intended to suggest any limitation as to the scope of use or functionality of operating environment architecture. Neither should the operating environment 600 be interpreted as having any dependency or requirement relating to any one or combination of components illustrated in the exemplary operating environment 600.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 601. The computer 601 can comprise one or more components, such as one or more processors 603, a system memory 612, and a bus 613 that couples various components of the computer 601 including the one or more processors 603 to the system memory 612. In the case of multiple processors 603, the system can utilize parallel computing.

The bus 613 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and one or more of the components of the computer 601, such as the one or more processors 603, a mass storage device 604, an operating system 605, cookie management software 606, cookie management data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 can comprise computer readable media in the form of volatile memory, such as random access memory (RAM), and/or non-volatile memory, such as read only memory (ROM). The system memory 612 typically can comprise data such as the cookie management data 607 and/or program modules such as the operating system 605 and the cookie management software 606 that are accessible to and/or are operated on by the one or more processors 603.

In another aspect, the computer 601 can also comprise other removable/non-removable, volatile/non-volatile computer storage media. The mass storage device 604 can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and a cookie management software 606. The cookie management data 607 can also be stored on the mass storage device 604. The cookie management data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 615.

In another aspect, the user can enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 603 via a human machine interface 602 that is coupled to the bus 613, but can be connected by other interface and bus structures, such as a parallel port, game port, an IEEE 1394 Port (also known as a Firewire port), a serial port, network adapter 608, and/or a universal serial bus (USB).

In yet another aspect, a display device 611 can also be connected to the bus 613 via an interface, such as a display adapter 609. It is contemplated that the computer 601 can have more than one display adapter 609 and the computer 601 can have more than one display device 611. For example, a display device 611 can be a monitor, an LCD (Liquid Crystal Display), light emitting diode (LED) display, television, smart lens, smart glass, and/or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display 611 and the computer 601 can be part of one device, or separate devices.

The computer 601 can operate in a networked environment using logical connections to one or more remote computing devices 614*a,b,c*. By way of example, a remote computing device 614*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614*a,b,c* can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components can reside at various times in different storage components of the computing device 601, and are executed by the one or more processors 603 of the computer 601. An implementation of the cookie management software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   causing, by a user device, based on a request to access an application on the user device, the application to send a request for a file, of a plurality of files, to a network device configured to store the plurality of files in persistent storage;
   receiving, by the user device, from the network device, the file;
   storing the file in non-persistent storage;
   causing, based on a change in a state of the application, the application to alter the file by making one or more changes to existing data of the file in the non-persistent storage; and
   sending, to the network device, the altered file for storage in the persistent storage, wherein the network device replaces the requested file in the persistent storage with the altered file.

2. The method of claim 1, wherein the request to access the application is based on one or more of: a request for a website or a request to run a HyperText Markup Language (HTML) application.

3. The method of claim 1, further comprising configuring the file for use by the application.

4. The method of claim 1, wherein the file comprises a cookie jar comprising a plurality of web cookies.

5. The method of claim 1, wherein the change in the state of the application is associated with an execution of a function of the application.

6. The method of claim 1, further comprising receiving, based on a request for the altered file, the altered file.

7. The method of claim 1, further comprising communicating with an Internet-based server device.

8. The method of claim 1, wherein the persistent storage comprises cloud-based storage.

9. The method of claim 1, further comprising determining, based on an execution of a function of the application, a state of the user device associated with the application.

10. The method of claim 1, wherein the request to access the application is based on a user input.

11. A system comprising:
    a computing device comprising one or more first processors and memory storing processor executable instructions that, when executed by the one or more first processors, cause the computing device to:
    cause, based on a request to access an application, the application to send a request for a file of a plurality of files;
    receive, from a network device, the file;
    store the file in non-persistent storage;

cause, based on a change in a state of the application, the application to alter the file by making one or more changes to existing data of the file in the non-persistent storage;

send, to the network device, the changed file; and the network device comprising one or more second processors and second memory storing processor executable instructions that, when executed by the one or more second processors, cause the network device to:

store the plurality of files in persistent storage;

receive the altered file; and replace the requested file in persistent storage with the altered file.

12. The system of claim 11, wherein the computing device is further configured to:

access the application via a HyperText Markup Language (HTML) application; and configure the file for use by the application.

13. The system of claim 11, wherein the file comprises a cookie jar comprising a plurality of web cookies and wherein altering the file by making one or more changes to existing data of the file comprises one or more of: altering a state associated with at least one web cookie of the plurality of web cookies, altering a user profile, alerting a game status, or altering merchant order information.

14. The system of claim 11, wherein the computing device is further configured to receive, based on a request for a website, the request to access the application.

15. The system of claim 11, wherein the computing device is further configured to determine, based on an execution of a function of the application, a state of the computing device.

16. An apparatus comprising:

one or more processors; and memory storing processor executable instructions that, when executed by the one or more processors, cause the apparatus to:

cause, based on a request to access an application, the application to send a request for a file, of a plurality of files, to a network device configured to store the plurality of files in persistent storage;

receive, from the network device, the file;

store the file in non-persistent storage;

cause, based on a change in a state of the application, the application to alter the file by making one or more changes to existing data of the file in the non-persistent storage; and send, to the network device, the altered file for storage in the persistent storage, wherein the network device replaces the requested file in the persistent storage with the altered file.

17. The apparatus of claim 16, wherein the request to access the application comprises one or more of: a request for a website or a request to run a HyperText Markup Language (HTML) application.

18. The apparatus of claim 16, wherein the processor executable instructions that, when executed by the one or more processors, cause the apparatus to determine the request to access the application further cause the apparatus to determine, based on a request to run a HyperText Markup Language (HTML) application, the request to access the application.

19. The apparatus of claim 16, wherein the file comprises a cookie jar comprising a plurality of web cookies.

20. The apparatus of claim 16, wherein change in the state of the application is associated with an execution of a function of the application.

21. The apparatus of claim 16, wherein the processor executable instructions, when executed by the one or more processors, further cause the apparatus to receive, based on a request for the altered file, the altered file.

22. The apparatus of claim 16, wherein the processor executable instructions, when executed by the one or more processors, further cause the apparatus to communicate with an Internet-based server device to access the application.

23. The apparatus of claim 16, wherein the persistent storage comprises cloud-based storage.

24. The apparatus of claim 16, wherein the processor executable instructions, when executed by the one or more processors, further cause the apparatus to determine, based on an execution of a function of the application, a state of the apparatus.

* * * * *